Aug. 30, 1932.　　　G. L. SMITH　　　1,874,822

BRAKE EQUALIZING MECHANISM

Filed Feb. 5, 1931

Inventor
George L. Smith
By Henry T. Bright
Attorney

Patented Aug. 30, 1932

1,874,822

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

BRAKE EQUALIZING MECHANISM

Application filed February 5, 1931. Serial No. 513,696.

My invention relates to brake equalizing mechanisms for use in automotive brake systems of the four wheel type.

The object of my invention is to combine equalizing action of the structure shown in my Reissue Patent No. 17,426 of September 3, 1929 with the inertia weight control mechanism of the front and rear sets of brakes as shown in my Patent No. 1,775,872 of September 16, 1930. In my first named patent the system illustrated and described employs a rotatable and swingable shaft between the front and rear brakes, the swingable end of which shaft is controlled by an elongated bearing whereas, in my present embodiment shown herewith, I support and control the swingable end of said shaft by said inertia weight control mechanism, and utilize the force of the weight to assist in application of the brakes, while I arrange my pull rod cross lever on the shaft so that the action of the inertia weight in increasing the tension on the front brake pull rods is greater than that decreasing the tension on the rear brake pull rods.

Figure 1:
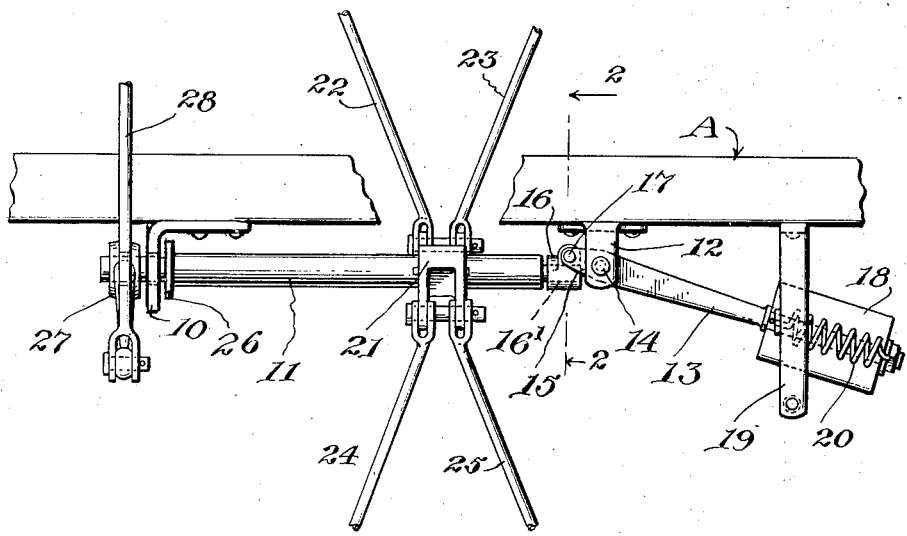
Figure 2:
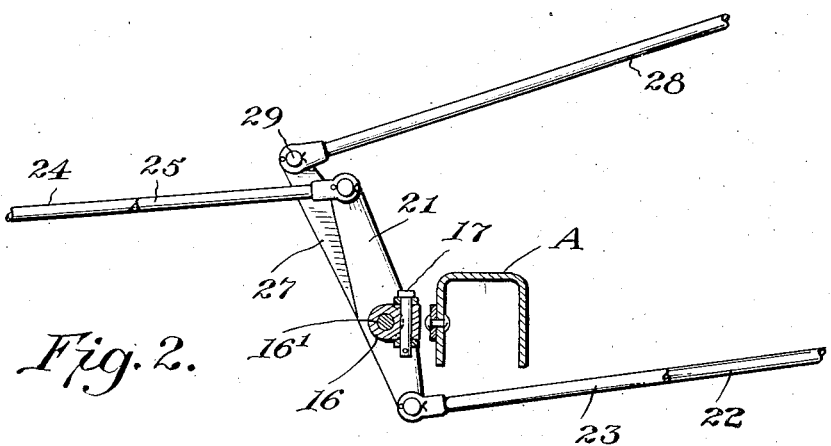

In the drawing chosen to illustrate my invention Figure 1 is a plan view of my invention; and Figure 2, a section on the line 2—2 of Figure 1.

In the drawing, A represents a cross frame member of an automobile chassis which I utilized to support the various parts of my device. I secure to this frame a bearing 10 to support one end of the shaft. This bearing is a narrow one and sufficiently loose to leave the other end of the shaft 11 free to swing. For the support of the swinging end of the shaft 11 I secure to the cross member A the bracket 12 upon which is pivotally mounted a lever 13 by means of the pivot pin 14. The short arm of this lever terminates in a jaw 15 which straddles a bearing block 16 and is pivoted to it by the pivot pin 17. The end of shaft 11 adjacent the block 16 is turned down to fit in a longitudinal hole 16' in said block and form a bearing therewith.

On the other end of lever 13 I mount a weight 18 and on the cross member A I secure a bracket 19 to support the weight and relieve the pressure that would otherwise come on pivot pin 14 and bracket 12. A spring 20 is connected to the weight 18 and to an ear on bracket 19 and holds the lever 13 in the position shown. Should it swing in either direction the spring 20 would act to swing it back again and bring the extended axis of the spring in line with pivot 14.

To the shaft 11 I secure a rocker 21 by a key or other suitable means so that it will rotate with the shaft. The upper and lower ends of this rocker are cut to provide eyes for the clevis ends of the brake pull rods 22, 23, 24, 25;—22 being the left front and 23 the right front rod, 24 the left rear and 25 the right rear rod. From Fig. 2 it will be noted that the upper arm of rocker 21 is longer than the lower one for reasons specified later, although in certain cases it might be desirable to make them of equal length.

On the shaft 11 I mount a washer 26 to act as a thrust member against the bearing 10 and a lever 27 on the opposite side of bearing 10 from the washer 26 to which lever I secure the pull rod 28 by means of a pin 29.

The mechanism operates as follows: A pull on rod 28 rotates shaft 11, but has very little effect in swinging it as the lever 27 is close to the bearing 10. Rotation of shaft 11 rotates rocker 21 and pulls in on rods 22–25 inclusive, thereby applying the brakes which these rods are intended to operate. The resulting retardation of the vehicle causes the weight 18 to swing forward or counter-clockwise in Fig. 1 and the lever 13, through its connection with bearing block 16, swings shaft 11 in a clockwise direction in Fig. 1 causing an increase in the tension of front pull rods 22—23 and a decrease in the tension of rear pull rods 24—25. The point of application of the force of the inertia weight 18 being closer to rods 22—23 than it is to rods 24—25 (see Fig. 2) the increase in tension on the rods 22—23 is greater than the decrease in tension on rods 24—25, so that this force actually assists in applying the brakes as specified in my aforesaid Patent No. 1,775,872 of September 16, 1930 and, as the leverage of this weight 18 is very high, the assistance it gives to the operator of the brakes is considerable. However, I wish it to be understood that I can, if found desirable, so apply the force in question that the increased tension on front rods will be equal to or even less than the decrease in tension on the rear rods. Such variation in action depends merely upon the choice of certain dimensions and requires no inventive skill.

I claim:

1. In a vehicle brake equalizing mechanism the combination of a shaft rotatable to transmit two brake applying forces in opposite directions and swingable to effect equalization of said two forces, and a weighted lever controlling the swinging movement of said shaft.

2. In a vehicle brake equalizing mechanism the combination of a shaft rotatable to transmit two brake applying forces in opposite directions and swingable to effect equalization of said two forces, and means operable by retardation of the vehicle movement to control the swinging movement of said shaft.

3. In a vehicle brake equalizing mechanism the combination of a shaft rotatable to transmit two brake applying forces in opposite directions and swingable to effect equalization of said two forces, and means operable by retardation of the vehicle movement to vary the equalizing action of said shaft.

4. In a vehicle brake equalizing mechanism the combination of a shaft rotatable to transmit two brake applying forces in opposite directions and swingable to effect equalization of said two forces, a movable bearing supporting the swinging end of said shaft, and an inertia weight connected to said bearing and controlling movement of the latter.

In testimony whereof I hereunto affix my signature.

GEORGE L. SMITH.